W. W. HELLE.
PRESSURE TESTER.
APPLICATION FILED DEC. 17, 1919.
1,372,022.
Patented Mar. 22, 1921.
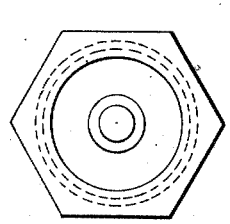
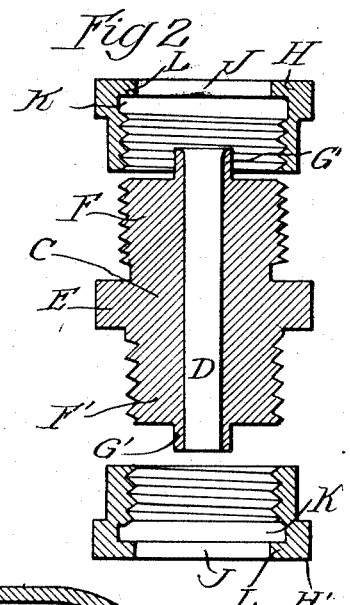
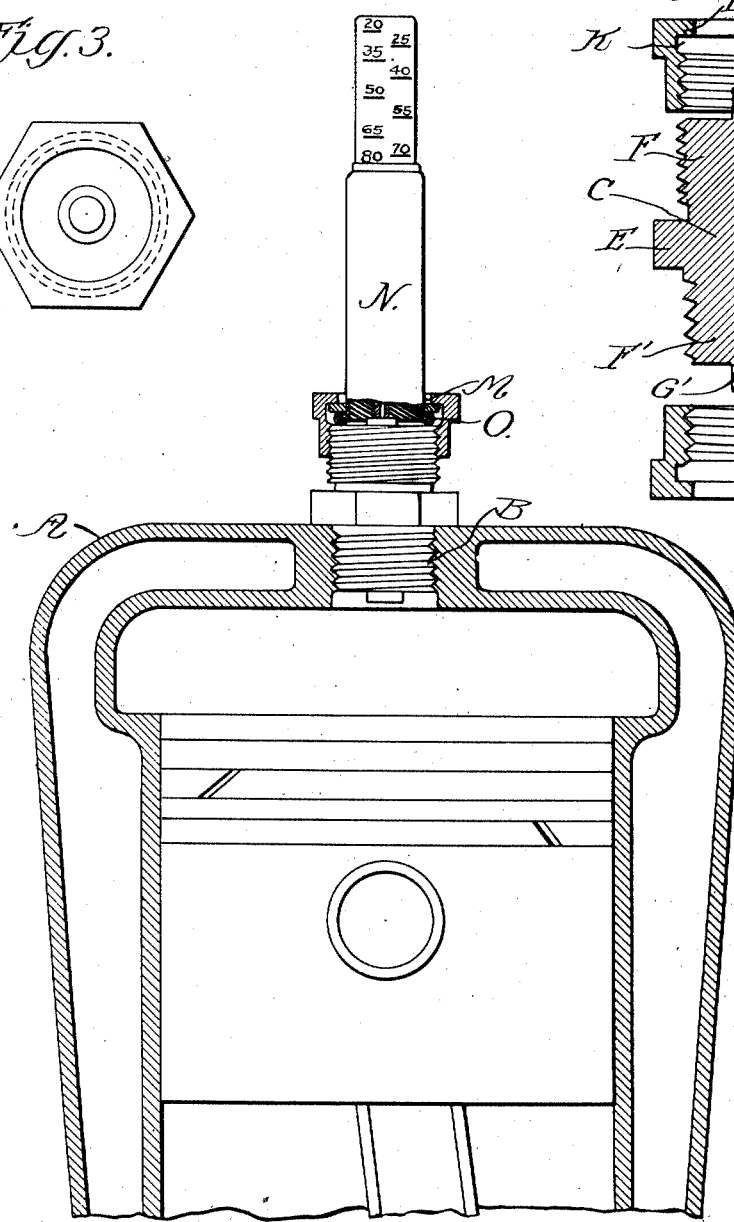

UNITED STATES PATENT OFFICE.

WARREN W. HELLE, OF HINSDALE, ILLINOIS, ASSIGNOR OF ONE-HALF TO ALEC WATTERS, OF CHICAGO, ILLINOIS.

PRESSURE-TESTER.

1,372,022.    Specification of Letters Patent.    Patented Mar. 22, 1921.

Application filed December 17, 1919. Serial No. 345,553.

*To all whom it may concern:*

Be it known that I, WARREN W. HELLE, a citizen of the United States, residing at Hinsdale, in the county of Dupage and State of Illinois, have invented new and useful Improvements in Pressure-Testers, of which the following is a full, clear, concise, and exact description, reference being had to the accompanying drawing, forming a part of this specification.

My invention relates to improvements in pressure testers, and has for its object the production of a device by means of which the pressure within an engine cylinder may be readily tested.

A further object is the production of a device adapted for use in connection with the openings of gages of varying diameters.

A further object is the production of a device by means of which different styles of gages may be used without danger of leakage.

A further object is the production of a device of simple and cheap construction, and one not liable to get out of order.

These and such other objects as may hereinafter appear are attained by my device, an embodiment of which is illustrated in the accompanying drawings, in which—

Figure 1 represents a perspective view of my device in position, with parts broken away;

Fig. 2 represents a sectional view of my device, disassembled; and

Fig. 3 represents a top plan view of the main coupling member.

Like numerals of reference indicate like parts in the several figures of the drawings.

Referring now to the drawings—

A represents an engine cylinder having a threaded opening B adapted to receive a spark plug or cap. My device consists in a coupling member C with a central bore D extending therethrough, and a centrally disposed hexagonal nut portion F. The ends FF' are screw threaded and of different diameter, as shown clearly in Fig. 2.

At either end a flange GG' surrounds the opening of the central bore, and projects beyond the end of the member, forming a valve unseating means when the device is put to use.

Special threaded caps HH' are provided to screw on the ends of the main member, each having a central opening J.

The upper ends of the caps are provided with a chamber as shown at K, and the enlarged ends of the caps have centrally disposed peripheral shoulders L adapted to form a seat for the flange O of the tire gage N when the device is put to use.

In order to permit the use of gages of varying diameters, I provide a ring or washer M fitting within the chamber K, and adapted to bear against the under surface of the shoulder L.

By the use of my device I am enabled to ascertain the pressure in any cylinder of the engine by simply removing the plug and screwing on my device, the gage having already been put in position on the other end and held firmly in place by screwing down the nut H which forces the gage against the washer or flange, preventing any escape of air during the operation.

The device is extremely simple and not liable to excessive wear, and fills a long felt want in the art.

I claim as new and desire to secure by Letters Patent of the United States:

1. A pressure tester comprising a coupling member having screw threaded ends of different diameter, a centrally disposed bore, valve unseating means surrounding the end of said bore, and chambered screw caps fitting over the ends of said coupling members.

2. A pressure tester comprising a coupling member having screw threaded ends of different diameter, a centrally disposed hexagonal nut portion, a central bore extending longitudinally of said member, and chambered screw caps fitting over the ends of said coupling member.

3. A pressure tester comprising a coupling member having screw threaded ends of different diameter, a centrally disposed bore, valve unseating means surrounding the end of said bore, chambered screw caps fitting over the ends of said coupling member, and a washer mounted within said chamber having an internal diameter less than the opening in said cap.

4. A pressure tester comprising a coupling member having screw threaded ends of different diameter, a centrally disposed hexagonal nut portion, a central bore extending longitudinally of said member, chambered screw caps fitting over the ends of said coupling member, and a washer mounted within said chamber having an internal diameter less than the opening in said cap.

In witness whereof, I have hereunto subscribed my name.

WARREN W. HELLE.